United States Patent [19]

Cannella, Jr.

[11] Patent Number: 5,854,840

[45] Date of Patent: Dec. 29, 1998

[54] DATA TRANSMISSION PROTOCOL METHOD AND APPARATUS

[75] Inventor: James E. Cannella, Jr., Roswell, Ga.

[73] Assignee: Scientific-Atlanta, Inc., Norcross, Ga.

[21] Appl. No.: 859,262

[22] Filed: May 20, 1997

Related U.S. Application Data

[62] Division of Ser. No. 429,160, Apr. 26, 1995, Pat. No. 5,668,810.

[51] Int. Cl.⁶ .................................................. H04L 9/00
[52] U.S. Cl. ................................................ 380/9; 380/49
[58] Field of Search ............................................ 380/9, 49

[56] References Cited

U.S. PATENT DOCUMENTS

| | | | |
|---|---|---|---|
| 4,646,287 | 2/1987 | Larson et al. | 370/60 |
| 4,688,218 | 8/1987 | Blineau et al. | 380/9 |
| 4,914,654 | 4/1990 | Matsuda et al. | 370/94.1 |
| 4,941,089 | 7/1990 | Fischer | 370/94.1 |
| 4,949,338 | 8/1990 | Albal et al. | 370/85.6 |
| 4,965,881 | 10/1990 | Dilley | 380/50 |

Primary Examiner—Salvatore Cangialosi
Attorney, Agent, or Firm—Kenneth M. Massaroni; Kelly A. Gardner; Hubert J. Barnhardt, III

[57] ABSTRACT

A data communications protocol for single path media having low data error rate requires the generation of a data packet with a start code field having a predetermined pattern, a byte count field for defining a data field having a maximum predetermined length in bytes, a data payload field having a byte count according to the value of the byte count field and a cyclic redundancy check field of predetermined length. The value of the byte count field may be fixed, may be changed from packet to packet or may be changed upon initialization. The described data communications protocol permits utilization with data types varying from high definition television to alarm reporting applications. Moreover, the data rate may be varied by varying an idle time signal duration up to a maximum (when the idle time signal duration is reduced to zero). According to one exemplary embodiment for plastic fiber optic media, MPEG2 transport stream packets may be transmitted at 54 MBaud over distances of 20 meters or even more with other media.

4 Claims, 7 Drawing Sheets

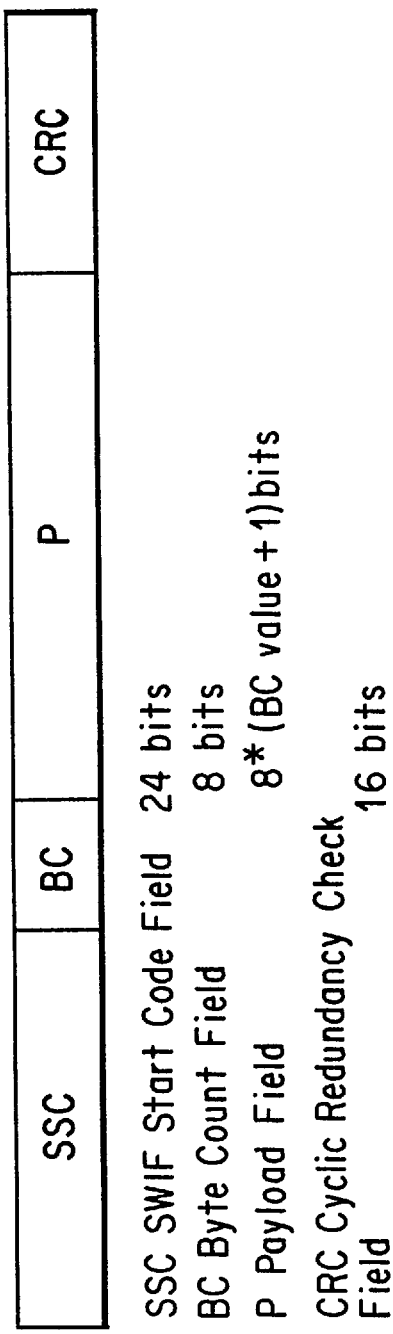
F I G. 3
SSC SWIF Start Code Field 24 bits
BC Byte Count Field 8 bits
P Payload Field 8*(BC value+1) bits
CRC Cyclic Redundancy Check
Field 16 bits

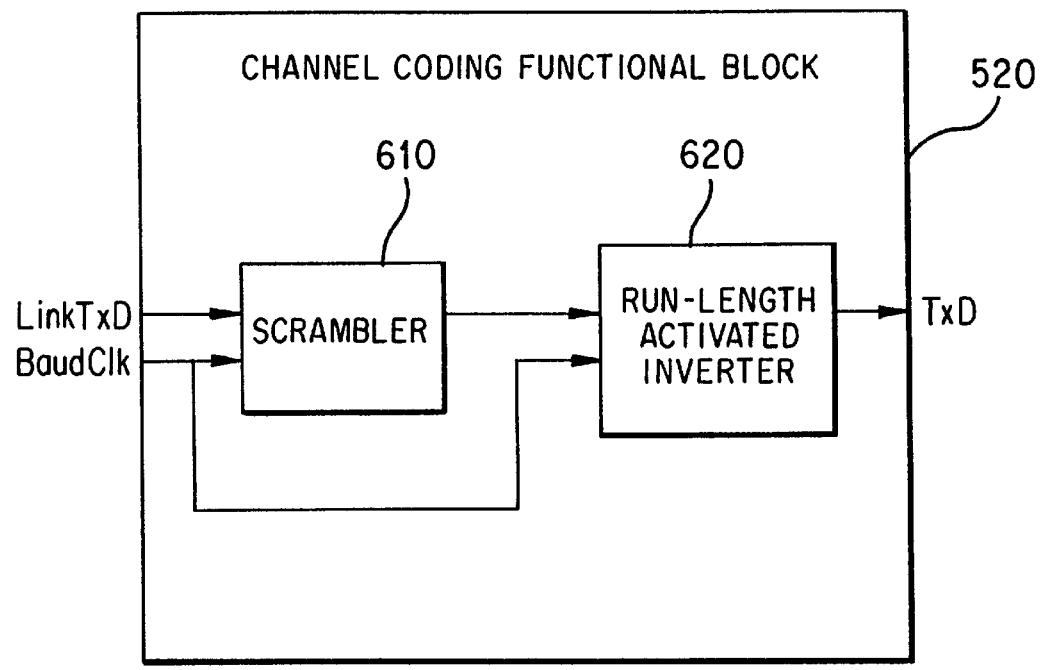
F I G. 6A
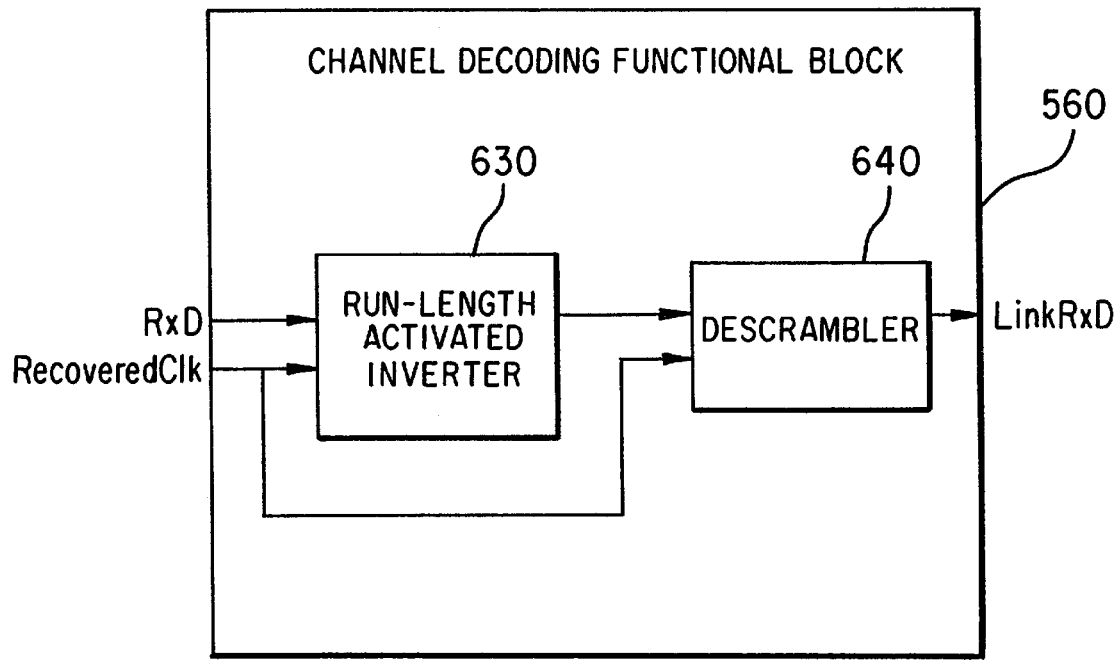
F I G. 6B

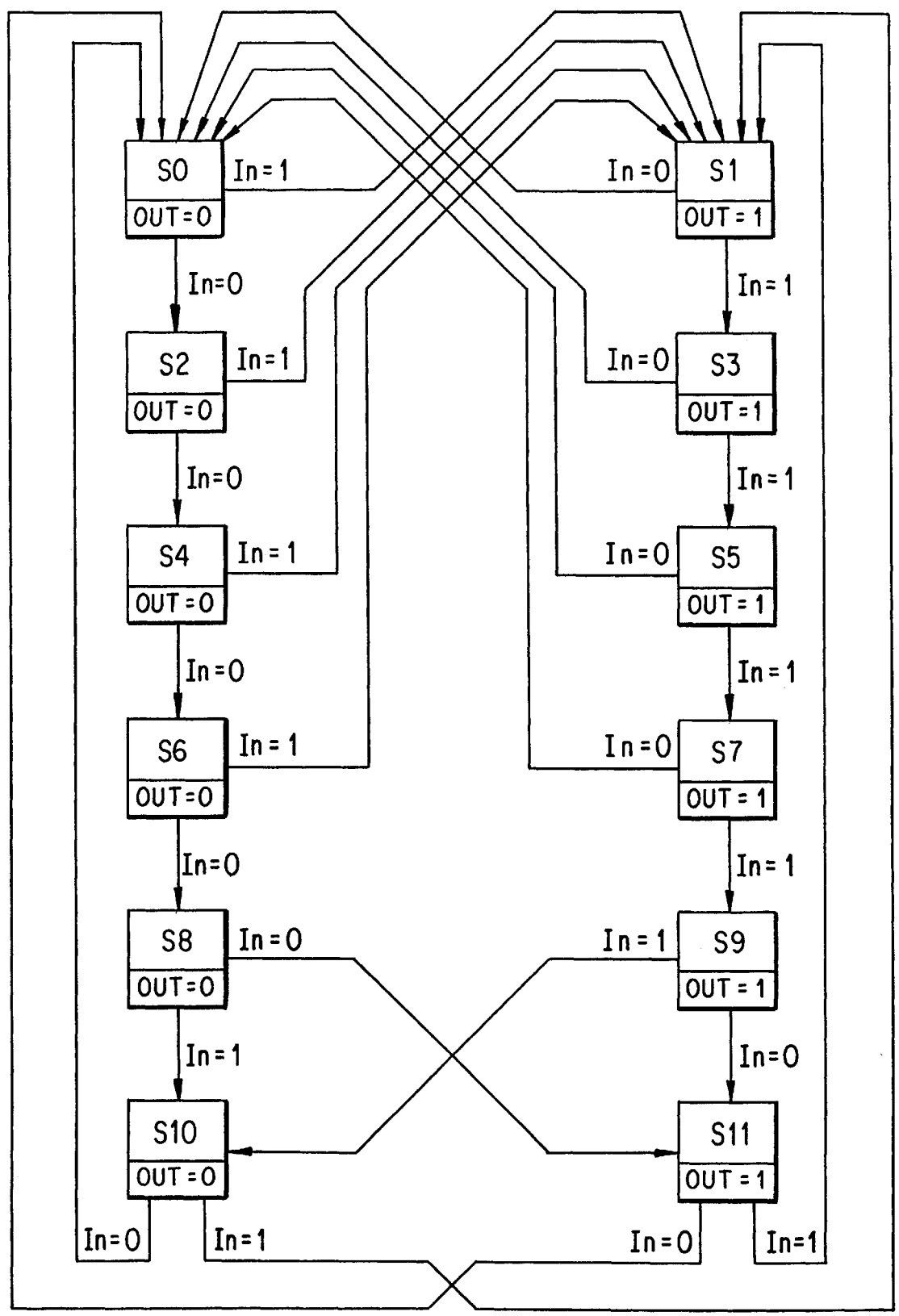
F I G. 7

DATA TRANSMISSION PROTOCOL METHOD AND APPARATUS

This application is a divisional of application Ser. No. 08/429,160, filed Apr. 26, 1995, now U.S. Pat. No. 5,668, 810.

BACKGROUND OF THE INVENTION

1. Technical Field

The present invention generally relates to the field of data transmission protocols and, more particularly, to a method and apparatus for originating and receiving a unidirectional data communication for serial transmission in accordance with the present protocol, permitting variable sized data packets and variable data rates, thus enabling efficient reception at a receiver of many different types of data, the protocol operative within a layered network communications model.

2. Description of the Related Art

Toward the end of the 1970's, a network communications model evolved which has come to be known in the telecommunications art as the Open Systems Interconnect (OSI) model. This model operates at a plurality of seven layers including, for example, the applications layer relating to a particular application, the session layer for setting up a session, the presentation layer which facilitates the display of a message, the transport layer which facilitates transportation of messages, the network layer for facilitating connections in a network, the link layer and the physical layer. In this patent application, reference will be made to two functional layers analogous to the two lowest layers of the OSI model, the link layer and the physical layer. Any other functionality outside these two layers will be referred to herein as, for example, user circuits. By "user" is meant one who is involved in the design of a communications network including the design of message originating and receiving equipment. "Datagram" service as defined within the OSI model and as used in the present application relates to transmission of data from a transmitter to a receiver without any requirement for acknowledgement of receipt of a transmitted message by a receiver.

In the same time frame, a number of data transmission protocols began to evolve utilizing the OSI model as an overall framework including, for example, the so-called TAXI protocol. Developed by Advanced Micro Devices Corporation for data communications between chips of a chip set, TAXI may be used to implement or define a substantial portion of an OSI-like physical layer but TAXI neglects link layer functions. For example, TAXI does not specify inter-device control which may be needed in the physical layer. Moreover, the circuits for implementing TAXI fail to provide block error checking.

TAXI suffers from other disadvantages as well, the solutions to which are required in the new world of multimedia data communication. For example, with MPEG2 audio and video data compression, it is useful to pinpoint the beginning and length of the MPEG2 data packets. Moreover, in the new multimedia world, it is important to provide for variable length packets operating at variable rates. Perhaps most importantly, TAXI involves substantial costs to implement and yet would have to be bolstered in functionality to meet desired objectives. TAXI, because it does not go far enough in meeting the objectives of the present invention, expects a user to add functionality by means of their own protocol and powerful error detection.

Other known data protocols were considered for solving the problems of providing an efficient single wire or path link interface data communication protocol and discarded. The well known Ethernet protocol was considered and discarded because it does not permit operation at fast enough data rates and circuitry would be too expensive. The so-called FDDI protocol was considered and rejected as too expensive and because of excess bandwidth not being required. The inter-device RS-232 and RS422 interface protocol were considered and discarded for being too slow, too short and requiring multiple conductors (not single wire).

Still other protocols were developed for other purposes, however, than to exchange variable data rate information such as digitized video (high data rate), audio, or slower speed data. Also, it became clear that a user may design the link layer and physical layer with anticipated noise sources in mind in such a way that transmission may occur relatively error free over a whole class of media. That class of media, for example, includes optical fiber, plastic fiber, coaxial cable, twisted pairs, solder runs on circuit boards, conductor runs, integrated circuit leads and so on, practically too numerous to detail here. Complex error detection and correction algorithms that might be required for, for example, satellite media, are not required for such ground-based media, including simple chip-to-chip data transmission contemplated by the TAXI protocol. More particularly, then, it became clear from a study of prior art protocols, there remains a requirement for a simple, efficient protocol permitting serial bit stream transmission of variable length packets at variable data rates over a single path.

SUMMARY OF THE INVENTION

The present invention solves the problems of prior art protocols by defining a simple, efficient data protocol, herein occasionally referred to as a Single Wire InterFace (SWIF) data link protocol, facilitating the interconnection of devices that exchange MPEG2 Transport Stream packets as well as different types of other data services. Wherever possible, the design has been generalized in anticipation of other applications.

The present invention provides an inexpensive, point-to-point connection for datagram-type service within the OSI model. The primary features of the link include: bit-serial transmission over a single path such as an optical fiber, coaxial cable, copper PCB run or other equivalent media from the class of media described above; parallel input/output (I/O) interface to user circuitry as required and, consequently, inherent parallel to serial conversion; variable user data rates; fixed signalling rates between devices; packetized protocol with the ability to vary packet lengths upon initialization or from packet to packet; rate control that minimizes variable latency in packet arrival; and bandwidth efficient transmission as well as other advantages as will be more fully described herein. As will be seen from the following detailed description of the invention, the SWIF link protocol conserves bandwidth over TAXI for the same data throughput or payload.

A data packet generator for generating data packets for transmission over single path media according to the present invention comprises a link layer responsive to user circuits for mapping received data into a payload field of a packet, for counting bytes mapped into the payload field, and for generating first and second headers, the first and second headers preceding the payload field of an output data packet. Between data packet transmissions, the single path media is filled with an idle time signal having a predetermined sequence that is different from a predetermined sequence defining the first header or SWIF link Start Code field (SSC), herein simply start code. The second header comprises a predetermined length byte count field which defines the length of the payload field for each packet. The first and second headers have predetermined lengths of three bytes and one byte respectively. Moreover, the data packets are Cyclic Redundancy Check (CRC) protected by an additional two byte data field of CRC data. Consequently, in accordance with the present invention, each packet may have a different payload length and accommodate different data packet lengths. Moreover, different rates of data transmission are automatically accommodated up to a calculable predetermined maximum rate by means of varying the length or duration of idle time signal as will be further described herein.

Associated data packet recovery apparatus for recovering data packets from a received serial data bit stream comprises an associated link layer, responsive to recovery of time base in a physical layer, for recognizing the first header, determining the beginning of the byte count field, decoding its value and counting the data bytes of the data payload field. During data packet recovery, pattern recognition can be suspended to eliminate the possibility of falsely recognizing the pattern of the first header in the received data. Once the byte count and data packet are detected, CRC data is collected and an error judgement made on the recovered data for forwarding to user circuits.

Thus, a data transmission protocol according to the present invention achieves the advantages sought, further advantages becoming apparent from a reading of the detailed description of the accompanying drawings which follows.

BRIEF DESCRIPTION OF THE DRAWINGS

FIG. 3 comprises a format for a link data packet including a SWIF Link Start Code field of predetermined length, a Byte Count field, a data field (herein referred to as a payload) and a Cyclic Redundancy Check (CRC) field for at least payload error detection, generated, according to the present invention, at the originating link layer circuit 110 for transmission via the physical layer over the assumed single conductor transmission medium of FIG. 1;

FIG. 6 comprises a functional block diagram of each of the channel coder and channel decoder of FIG. 5; and FIG. 7 comprises a state diagram of a run length activated inverter machine of the coder and decoder of FIG. 6 showing the eleven states, S0 ... S11, of each of input, In, and output, Out, the machine advancing once per clock.

DETAILED DESCRIPTION

Figure 1:
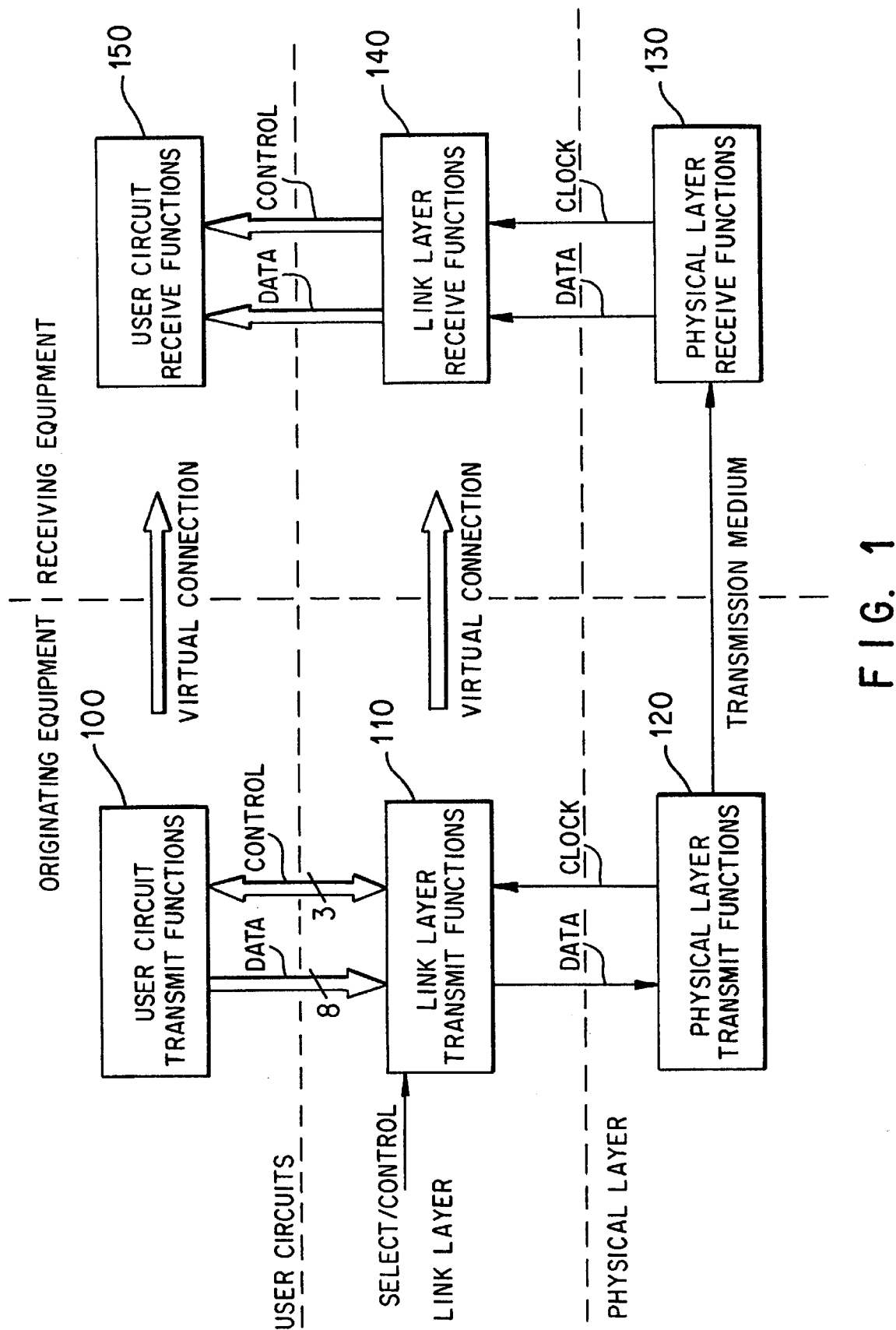
FIG. 1 comprises an overall system block diagram showing the functional partitioning of a data transmission system according to the protocol of the present invention.

Referring to FIG. 1, a system incorporating the protocol of the present invention is partitioned horizontally by dashed lines into two functional layers. Analogous to the lowest two layers of the ISO's seven-layered Open Systems Interconnect model, these functional partitions will be referred to herein as the Link Layer and the Physical Layer. Any other functionality outside these two layers will be referred to as "User Circuits" throughout.

The layered functionality of the present invention is particularly illustrated in FIG. 1. In the originating equipment, separated by a vertical dashed line from receiving equipment, the objective of user circuits 100 is to generate message data for a data packet for communication to the user circuits 150 in the receiving equipment, hereinafter referred to as user data. The message may comprise practically any information carrying data including, but not limited to, television, computer game, audio, software, alarm, security, energy management, usage data or any other data. These message data may be formatted differently according to different protocols into different length data packets. The user of the protocol of the present invention, as defined above, may be a chip manufacturer designing a link between chips on a printed circuit wiring board or a system manufacturer designing equipment for data communication over an optical fiber. For example, plastic fiber connections may be considered for connecting apparatus in a telecommunications/cable television central office or head-end. This user data is typically passed from originating equipment User Circuitry 100 to the Link Layer 110 through a parallel interface including an eight bit (single byte) wide message data channel and a three bit wide control bus, as will be further defined herein. The Link Layer 110 operates on the user data (including parallel to serial conversion) to implement the present protocol that provides packet synchronization, rate control, and error checking. Link Layer circuits 110, shown in FIG. 1 as link layer transmit functions block 110, serialize the user data received over the 8 bit parallel data bus, multiplex it with link overhead bits (described in further detail herein as comprising first and second headers and cyclic redundancy check data), and output this bitstream to the Physical Layer 120 via a single data line clocked by a single clock lead from the Physical Layer 120. The Physical Layer 120, represented in FIG. 1 by Physical Layer Transmit Functions block 120, operates on the protocolized bitstream, conditioning it for the chosen single conductor medium (Transmission Medium) and controlling transmission timing. Cabling, connectors, signal level, modulation scheme, and bandwidth are determined in the physical layer 120 by the user for a particular application of the present protocol.

Each or both of the link layer and physical layer functions as described in detail herein may be most conveniently implemented in the form of a portion of or an individual Application Specific Integrated Circuit (ASIC) or portions of multiple ASIC's according to user design criteria. Alternatively, they may be implemented as larger scale electronic devices or components if desired.

In the receiving equipment, comprising Physical Layer Receive Functions block 130, Link Layer Functions block 140 and User Circuit Receive Functions block 150, the reverse processes are performed in each layer as the message passes through the layers in reverse order. This results in the receiving equipment user circuits 150 being presented with the original message plus an indication of errored or error-free transmission of each transmitted packet, all with packet synchronization maintained. Thus, while the actual physical connection with transmission media is in the Physical Layer, a virtual connection is established between user circuits 100 in the originating and receiving equipment as if the user transmit and receive circuits had directly communicated. One of ordinary skill in the art will note that another virtual connection exists at the Link Layer level between blocks 110 and 140.

The present invention then further includes, in its essence, a Single Wire InterFace (SWIF) link specification associated with a preferred physical layer, the physical layer specification described subsequently herein. Briefly, the physical layer specification, described further herein covers most anticipated applications of the present protocol, but functional partitioning according to FIG. 1 implies an extensibility to other applications and other physical layer specifications as well. Already envisioned are applications employing glass fiber for greater transmission distances, applications for copper media, or plastic optical fiber applications with signalling rates of 125 MegaBaud or more. The present invention may even be used as a low pin-count interface between integrated circuits sharing the same circuit board. While applications may be perceived to be boundless, it must be appreciated that the present invention may not be suitable for known or anticipated high error rate transmission media such as satellite media which operate over long haul distances. Of course, higher data rate applications or bidirectional applications may be accommodated by employing multiple conductors with or without changes to the physical layer as required. Each conductor, then, would be accommodated and arranged for bit serial transmission as shown in FIG. 1 in accordance with the SWIF link protocol of the present invention.

In the Link Layer, the present invention provides a protocol to manage the transmission of user data from the originating equipment to the receiving equipment. The protocol allows the communication of packet boundaries across the serial connection between the Link Layer and the Physical Layer, without requiring a separate signal for packet synchronization. In addition, the protocol provides a scheme for performing block error detection (namely CRC), as well as a mechanism for the control of user data throughput.

According to FIG. 1, Link Layer circuits preferably communicate messages (as opposed to control information) with User Circuits or related user circuitry over respective boundaries in originating and receiving equipment through a parallel (byte-wide) data interface or data bus labeled Data, and between the Link Layer and the Physical Layer using a single lead or serial interface likewise labeled Data. In a preferred embodiment of this link, forty-eight bits of overhead are added to the message as will be further described herein.

The interface between the Link Layer and User Circuits provides an eight bit data port for packet transfers into the link in the case of originating equipment, and out of the link in receiving equipment. The interface operates asynchronous to user clocks, and therefore specifies the handshaking necessary to control the timing and rate of byte transfers. Also provided in addition to message signals are signals (to be further described herein in connection with a discussion of a Start Code field, Byte Count field and CRC field of FIG. 3) to mark the beginning of each packet, to signal the length of a packet and, in the receiving equipment, to determine whether the previous packet was transmitted through the physical layer only to arrive with a data error. Users integrating Link Layer circuitry with user circuitry, so that the implementation of both sides of the interface is determined by the user, may modify the handshaking signals to achieve circuit efficiencies. This is in fact the typical implementation in presently anticipated equipment, where user circuits are integrated with Link Layer circuits in Application Specific Integrated Circuits (ASIC's) that have only the Physical Layer serial bitstream brought out of the chip. In such a case, the present interface description may be treated as a conceptual guideline only, and not strictly, a specification.

Referring again to FIG. 1, in the originating equipment, the user circuit/link layer interface preferably consists of eight data signals and three control signals, but may comprise a wider or narrower parallel fed data stream according to design preferences. The presumed bytewide user data is collected and mapped into the Data Packet Payload field shown in FIG. 3 of variable length defined by the Byte Count (BC) field of FIG. 3. Data(7) is assumed to be the most significant bit and, after serialization, will be transmitted first. Data(0) will be transmitted last. Data[7:0] will be further described herein in connection with FIGS. 2 and 4.

There exist according to the present invention, three control leads between User Circuits 100 and the Link Layer 110: BaudClk, Load and Ready. "BaudClk" is what the Link Layer 110 provides to user circuitry 100 across the interface for synchronization purposes. This signal is actually generated in the Physical Layer 120, where it is used to set a fixed signalling rate. Byte transfers from User Circuit 100 to Link Layer 110 occur when the rising edge of this signal is enabled by a high logic level on the "Load" signal.

"Load" is what the Link Layer circuits 110 generate as an active high signal to inform the User Circuits 100 that a byte transfer is taking place. During a packet transfer, "Load" will go high once every eight cycles of the "BaudClk", assuming a byte, eight bit parallel transfer. User circuitry 100 should present a valid data byte to the interface during the "Load" high time.

"Ready" is what the User Circuits 100 generate as an active high signal to inform the Link Layer 110 that enough data is available to begin transferring a new packet across the parallel interface. Once the transfer has begun, the Link Layer will attempt to read out an entire packet of data. No mechanism is provided for pausing in mid-packet.

The "Ready" indication should be held high until acknowledged by the next "Load" pulse. Link Layer circuits 110 will ignore any activity on the "Ready" line between the first and last "Load" pulses of a packet transfer. After the last "Load" pulse, "Ready" must be taken low for at least one period of the "BaudClk" signal. At that point, Link Layer circuits 110 will recognize new "Ready" indications.

"BaudClk" is also used to sample the "Ready" signal, giving user circuitry 100 a high resolution indication of the actual time of data packet transmission.

In the receiving equipment, the user circuit 150 interface with the link layer 140 consists of eight data signals and four control outputs. Again, byte-wide (eight bit) data transfer across the interface is assumed. Bytewide user data is extracted from the Data Packet Payload field shown in FIG. 3. The bits are ordered such that the earliest arriving bit of any user data byte will be found on Data(7). The latest arriving bit will be on Data(0). Data[7:0] will be further described herein in connection with FIGS. 2 and 4.

There are four control signals utilized between the Link Layer Receive Functions and the User Circuit Receive Functions: RecoveredClk, ByteValid, FirstByte and Error.

"RecoveredClk" is the transmit baud clock as recovered in the receiving equipment Physical Layer circuits 130. Link Layer circuits 140 buffer this signal out to the receiver User Circuits 150. Byte transfers from Link Layer 140 to User Circuits 150 occur when the rising edge of this signal is enabled by a high logic level on the "ByteValid" signal.

"ByteValid" is what Link Layer circuits 140 generate as an active high signal to inform the user circuits 150 that a byte transfer is taking place. During a packet transfer, "ByteValid" will go high once every eight cycles of the "RecoveredClk". Link Layer circuits 140 will present a valid data byte to the interface for the rising edge of "RecoveredClk" that occurs during the "ByteValid" high time.

"FirstByte" is what receive Link Layer circuits 140 generate as an active high signal to inform the user circuits 150 that the current byte transfer is the first byte of a new packet transfer.

"Error" is what Link Layer circuits 140 generate as an active high signal to inform the user circuits 150 when there is a failure of the Cyclic Redundancy Check described in FIG. 3 for checking the data payload.

Wherever above an indication has been given that a signal be active high or a rising edge may signal an event, reverse polarity logic or other designs may be equally used to advantage and the signal may be active low or a falling edge may signal the event.

Figure 2:
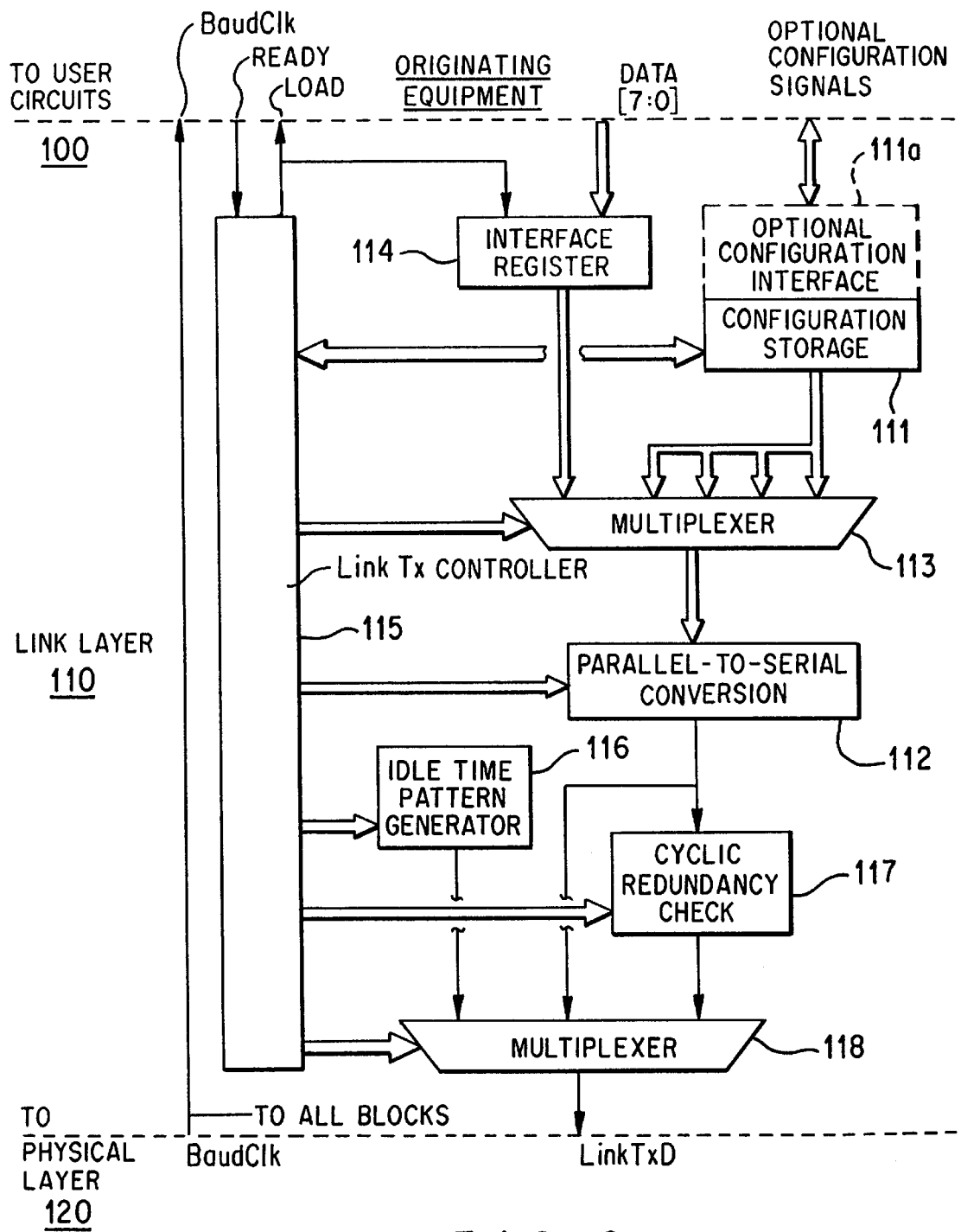
FIG. 2 comprises a block schematic diagram of one embodiment of an originating link layer circuit 110 of FIG. 1.

Referring now to FIG. 2, there is shown a functional schematic block diagram of one design of a portion of an ASIC utilized for link layer transmit functions block 110. Other designs may come to mind from understanding the protocol of the present invention or from its use in other applications. The various control and data signals BaudClk, Ready, Load and Data[7:0] have already been described above. Briefly, Data[7:0] is received over an eight bit wide data bus at parallel to serial converter 112 via an eight bit buffer interface register 114 and byte multiplexer 113. Interface register 114 interfaces byte-wide user data to byte multiplexer 113 and handshakes with "BaudClk" and "Load". The parallel to serial converter 112 outputs a serial data stream including all overhead except CRC to bit multiplexer 118 where CRC is added via CRC generator 117. Bit multiplexer 118 outputs the serial data packets with all overhead as LinkTxD (Link transmit data).

As described above, the Ready lead signals that the user circuits are ready (enough data is available for transfer) and the Load lead signals the user circuits that the load function is occurring. In this manner, user data makes its way from the user circuits 100 to link layer 110. It may be appreciated by those skilled in the art that certain link layer functions such as the interface register 114 and configuration storage 111 may comprise a portion of user circuits 100.

Configuration Storage 111 comprises a permanent memory indication of how the parallel data is to be configured with Start Code and Byte Count overhead and controls byte multiplexer 113 along with controller 115. Configuration Storage 111 maintains SWIF Start Code (SSC), herein referred to simply as Start Code, and Byte count (BC) values and may, additionally, store programmable idle time signal pattern data. If there is no optional interface 111a, the configuration storage 111 may be hard circuitry or NVM. If the optional interface 111a is present, then, the SSC and, especially, BC values may vary under optional configuration signal control. There exists at least three optional modes of implementation of the signal control, i.e., the values never change, they change at start-up (initialization of the ASIC) or on a per packet basis. For example, in a start-up mode, a change may be made between MPEG2 packet lengths of 188 bytes and packet lengths for asynchronous transfer mode (ATM) data cells. The Configuration Storage 111 outputs SWIF Start Code (SSC) and Byte Count (BC) to the byte multiplexer 113 and the Byte Count also to controller 115. There is shown a functional bus depicted as single bus leaving configuration storage 111 and arriving as a plurality of four parallel buses at byte multiplexer 113. The four buses entering byte multiplexer 113 are intended to represent the first three bytes of Start Code and the byte of Byte Count respectively.

Link Tx Controller 115 is the operations controller of the ASIC or ASIC portion and operates according to hard-wired logic processes or algorithms stored in a program memory, which may be Configuration Storage 111. One function of Controller 115 is to control the loading and the generation of overhead data. The Byte Multiplexer 113 chooses between Start Code SSC byte 1, 2 or 3, BC byte, or user bytes from user circuits 100 received via register 114 for output to parallel to serial converter 112. The connection with controller 115 provides the select function. Parallel to serial converter 112 converts the byte mux 113 output of start code, byte count and user data bytes to serial form for output under control of controller 115.

The Payload field (FIG. 3) is filled with data referring to the Byte Count value and, as the byte count value is reached, the CRC field of FIG. 3 is generated by CRC generator 117 for the Byte Count and Payload fields under control of controller 115. The input to the CRC generator 117 is the serial output stream of start code, byte count and user data. The controller 115 initializes the CRC generator 117, causes the CRC calculation to ignore start code data and sequences the two byte serial CRC result to bit mux 118.

During the generation of data packets for transmission via LinkTxD, a first header or three byte start code field according to FIG. 3 is generated via output from storage 111 to byte multiplexer 113. A second header, output via Configuration Storage 111, comprises the byte count field set at the binary value of the predetermined byte count in memory 111.

As already explained, the two byte CRC field is determined from the values of the byte count and payload fields. As the data packet is completed with CRC data, it is transmitted over the data line LinkTxD to physical layer 120 in accordance with its clock line BaudClk line provided to all blocks of FIG. 2 from a time base of the physical layer not shown. The bit multiplexer 118 outputs the data packet over the data line as it is formed to physical layer 120.

At this point, the controller 115 controls generating an idle time signal output by causing idle time pattern generator 116 to introduce idle time pattern into the bitstream which comprises a different predetermined sequence from the start code field. Idle Time Pattern Generator 116 is reset by the controller 115 and may comprise a divide by two circuit or shift register or may be configured by the controller (or even reconfigured via the optional configuration interface 111a). The output idle time signal is preferably a predetermined binary pattern of alternating ones and zeroes. Preferably, the Data[7:0] is NRZ coded on receipt; if not, controller 115 codes the data as NRZ (non-return-to-zero) data prior to transmission as LinkTxD to physical layer 120 via an appropriate design of interface register 114 or other means to enhance clock recovery at a receiver 130.

According to the present invention, data packet sizes for different types of data may be adjusted by select/control of memory 111 via the optional configuration interface 111a. When the byte count is to be changed, for example, for a change from MPEG2 data to another form of data, a data value for the byte count field may be written into memory 111 or selected from a plurality of operable choices.

Referring now to FIG. 3, the link data packet format will be described in some detail. The described data structure is generated around, and includes, the user data or Payload field (P). The overall data structure provides the information necessary to maintain packet synchronization through the Physical Layer. The overhead associated with the packet format is, preferably, a fixed 48 bits (six bytes) per packet and comprises the sum of SSC, BC and CRC. It is a function of the Link Layer circuitry 110 in the originating equipment to perform the construction of the formatted packets; "deconstruction" occurs in the Link Layer circuitry 140 (for example, FIG. 4) of the receiving equipment. FIG. 3 shows a diagram of the format of a data packet according to a preferred embodiment of the present invention. The generated data packet is a time multiplex of four separate bit fields, the Start Code field, the Byte Count field, the Payload, and the CRC field. The Start Code field and Byte Count field may be described as first and second header fields or headers that identify the packet beginning and packet length. User data, as already described, is collected and is mapped into the Payload field. The CRC field is a trailing field that provides a mechanism for block error detection to be performed across the entire packet excluding the Start Code field. Error correction is not provided but block error detection is provided so that the receiving user circuits 150 may be notified of a data error in the packet.

The first field of a data packet formatted according to the present invention is a twenty-four bit (three byte) sequence known as the Start Code field. This field alerts packet deconstruction circuits to the beginning of a new packet. By detecting this pattern in the bitstream, Link Layer circuits 140 in the receiving equipment can locate the Byte Count field and, since the Byte Count field has predetermined length, the beginning of the Payload field. The pattern should be matched exactly (Hamming distance of zero). If there is a match to a predetermined pattern, then, the start of the subsequent fields may be accurately determined. Detection of the Start Code field (SSC) causes the CRC register to be seeded and initiates the CRC calculation on the receive data. Detection of the SSC also disables any further start code SSC detection until termination of the current packet. This eliminates false SSC detection during coincidental pattern recognition in user data. Link Layer circuit 110 implementations should provide for programmability of the SSC value as a predetermined sequence, for example, that may be stored in configuration storage 111 like the byte count and idle time pattern values. However, it is permissible to implement the SSC as a fixed value, as long as the values used by the originating and receiving equipment agree. An idle time signal discussed herein for transmission between data packets should comprise a different predetermined sequence from the Start Code field.

The second field of a data packet formatted according to the present invention is the eight bit Byte Count field. This field is used to indicate the length of the Payload field. In conjunction with the SSC, it is used to find the end of the current packet. The binary value in the field is equal to one less than the actual number of bytes of user data in the Payload field. For example, if the Byte Count field contains the binary pattern "00000000", this would indicate one byte of user data will follow. Likewise, the pattern "11111111" would indicate two hundred fifty-six user data bytes in the following Payload field, not two hundred fifty-five. For the typical one hundred eighty-eight byte payload (one MPEG2 Transport Stream packet), the Byte Count binary value would be "10111011". Although MPEG2 contemplates 188 byte payloads, the present eight bit wide Byte Count field anticipates a greater requirement which may still be further adjusted upward depending on future applications. Other typical byte count field values would be set for other data transmission protocols such as asynchronous transfer mode (ATM) cells.

The third field of a data packet according to the present invention is the variable length data field or Payload field. This field contains the input user data Data[7:0]. As stated above, the length of this field is determined by the value in the Byte Count field and may range from a minimum of eight bits to a maximum of two thousand forty-eight bits. Note that the present Link Packet Format of FIG. 3 permits dynamic control of packet length on a per packet basis, as long as this feature is supported by the particular implementation of the parallel interface to user circuitry. Most applications may not require this dynamic length control, but will instead involve only the transmission of identical length packets.

The fourth field of a data packet formatted according to the present invention is the sixteen bit, two byte, CRC field. This field contains the result of performing a cyclic redundancy check across the Byte Count field and the Payload field and excluding the Start Code field. The CRC-CCITT polynomial is used for this calculation. The bits in the SWIF link Start Code field are not included in the CRC calculation; as already explained, the Start Code field must match identically or following data may be discounted or ignored.

The user data rate is continuously and dynamically variable. To restate, the data link of the present invention supports any user data rate between zero and the maximum specified in the Physical Layer, and allows the user data rate to be changed at any time. In all cases, the fixed data link signalling rate will be greater than or equal to the user data rate.

Rate control is accomplished by providing a variable length Idle Time between data packets formatted according to FIG. 3. The Idle Time begins with the first bit time after the CRC field ends, and lasts a variable number of whole bit times as per clock signals. Idle Time is terminated by the simple expedient of transmitting the next Start Code field SSC. Varying the Idle Time varies the bandwidth available for user data. It is the variability of the Idle Time, sometimes referred to herein as that allows the data link of the present invention to operate with a fixed signalling rate while accommodating variable user data rates.

Figure 5:
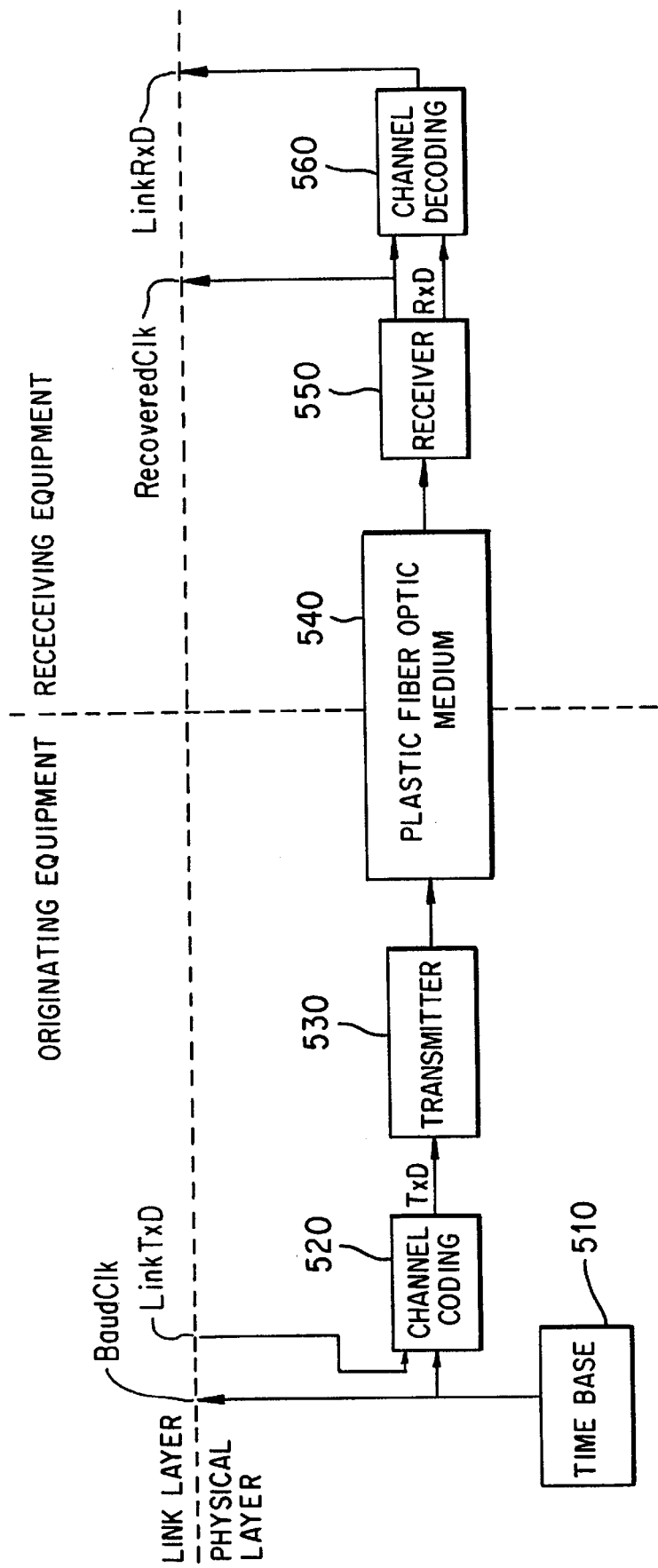
FIG. 5 comprises a functional block diagram of a physical layer according to FIG. 1, by way of example only, showing a plastic fiber optic transmission medium.

During the Idle Time, the Link Layer sends a predetermined pattern different from the start code pattern, for example, a pattern of alternating ones and zeroes. Referring briefly to FIGS. 5 and 6, any additional scrambling or data encoding done in the Physical Layer will naturally be performed on the Idle Time pattern just as it is performed on the data packet formatted according to FIG. 3. Since Idle Time bits are discarded at the destination, other functionally equivalent patterns may be transmitted during the Idle Time, if care is taken in the Physical Layer to ensure acceptable transition densities.

To minimize the variable latency in the transmission of packets, and thus minimize system jitter, the SWIF data link according to the present invention allows termination of the Idle Time on any bit edge. To reduce circuit complexity, the actual implementation of Link Layer circuitry may limit Idle Time termination to only those bit edges that align with byte boundaries. The requirements of the user system determine which level of temporal resolution is required.

Referring again to FIG. 1, Link Layer circuitry is responsible for data serialization. In the originating equipment, Link Layer circuits 110 perform a parallel-to-serial conversion on user data bytes received from User Circuits 100. Bit ordering is maintained so that the most significant bit of any user data byte is transmitted first. In the receiving equipment, Link Layer circuits 140 perform a serial-to-parallel conversion on incoming data to recover the user data bytes. The parallel data stream is then passed on to receiver User Circuits 150 in parallel.

The interface between the Link Layer and the Physical Layer in both the originating and receiving equipment is a two wire (clock and data) serial port. Bit transfers across the interface occur at the Physical Layer baud rate. The transfer datastream consists of data packets formatted according to FIG. 3 being multiplexed with intervening Idle Time bits.

In the originating equipment, the transmit time base of the Physical Layer 120 provides the clock signal for the serial data interface. Data flows from Link Layer 110 to Physical Layer 120. The two wire serial port comprises BaudClk and LinkTxD leads labeled in FIG. 1 more generically Clock and Data leads respectively.

BaudClk is what the Physical Layer generates to the interface with the Link Layer for bit synchronization purposes. Physical Layer circuits use the rising edge of this signal to sample the received serial data.

LinkTxD represents Link transmit (Tx) data. This signal is the NRZ coded serial bitstream output from the Link Layer 110 to the Physical Layer 120.

In the receiving equipment, the recovered time base of the Physical Layer provides the clock signal for the serial interface via the single clock lead shown. Data flows from Physical Layer 130 to Link Layer 140 via the single data lead shown. The two leads may be further described as RecoveredClk and LinkRxD rather than clock and data respectively of FIG. 1.

RecoveredClk is the signal that the Physical Layer 130 generates to the interface for bit synchronization purposes. Link Layer circuits 140 use the rising edge of this signal to sample the serial data.

LinkRxD represents Link receive (Rx) data. This signal is the NRZ coded serial bitstream output from the Physical Layer 130 to the Link Layer 140.

Whenever rising edge has been referred to above, it should be recognized that the user of the present protocol might equally define the discussed signal to be reversed in polarity or otherwise designed for sampling on its falling edge.

Figure 4:
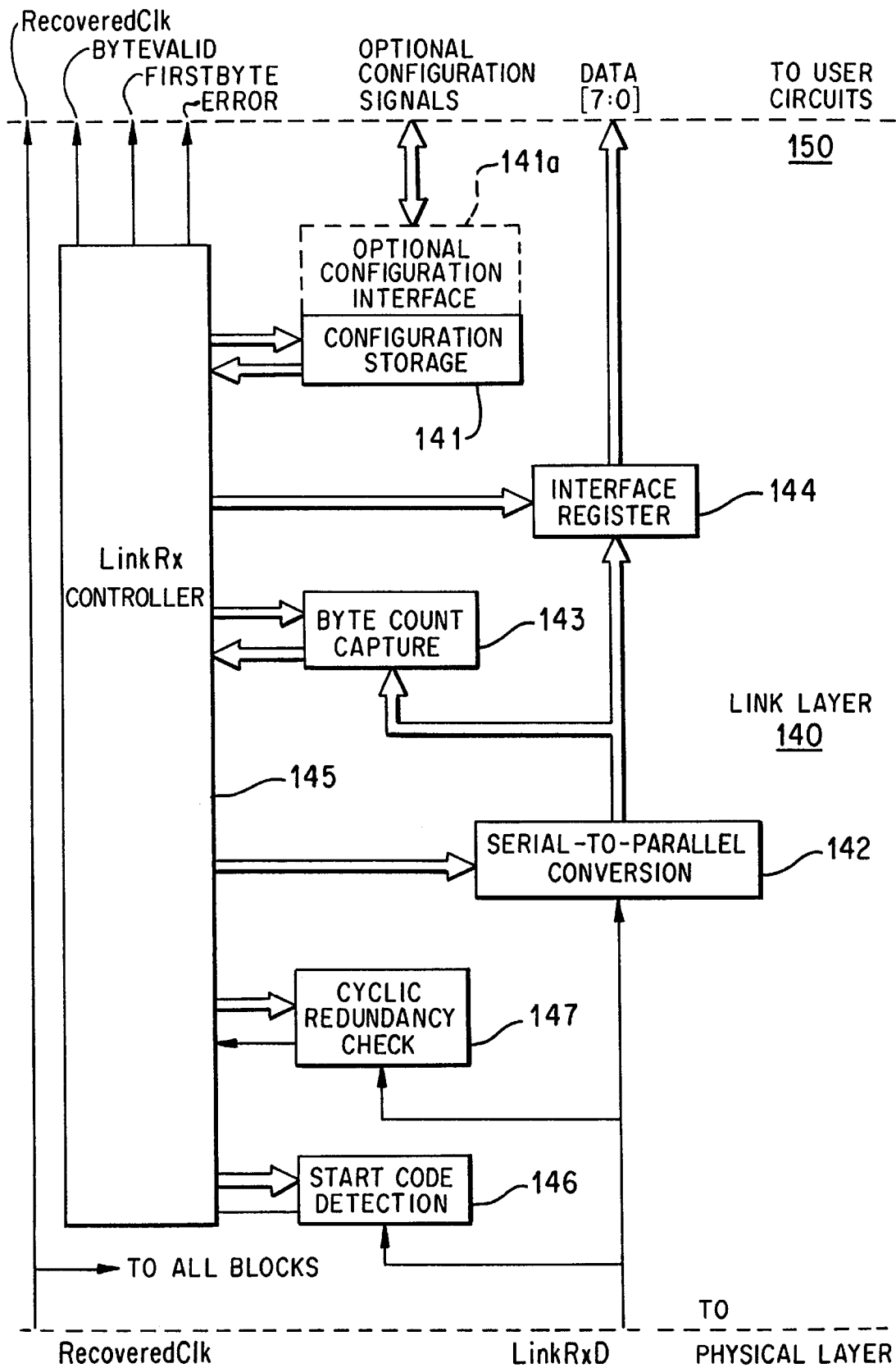
FIG. 4 is a schematic block diagram of the link layer receiver apparatus 140 of FIG. 1.

Referring now to FIG. 4, one example of a receive link layer circuit is shown which may not be a preferred design for other applications. The operation of a data packet recovery circuit incorporating link layer receive functions 140 will be further described in view of this exemplary embodiment. Discussion associated with the fabrication of link layer 110 applies to fabrication of link layer 140, for example, fabrication as a part of an ASIC, a single ASIC or multiple ASIC's or other constructions. Moreover, the earlier presented discussion of RecoveredClk, ByteValid, FirstByte and Error apply to FIG. 4. Data packet recovery 140 operates in an opposite manner to link layer 110 but comprises similar construction. Briefly stated, the link layer 140 operates as follows in the receiving equipment. The data stream received over the data lead LinkRxD at Serial to Parallel Converter 142 and Start Code detector 146 from physical layer 130 must match identically with a predetermined sequence stored in configuration storage 141 as the start code field. As earlier described with respect to originating link layer 110, the Start Code field may be user programmable with optional configuration storage leads to memory 141 via optional interface 141a or otherwise programmable. Controller 145, once signalled by Start Code detector 146 of the start code match then knows to recognize the following field as the byte count field and determines its value via Byte Count capture 143. The next bytes on the data line are counted and mapped into interface register 144 and output a byte at a time and presumed to be the data payload bytes. The CRC data field is collected from the input data bitdtream at CRC check 147 and used to determine if an error condition exists on the recovered data packet for output on Error. The data signal Data[7:0] and the error signal are then output to user circuits 150 in accordance with the clock control signal RecoveredClk.

More particularly, the start code detector 146 detects a serial data input and looks for the start code pattern which must match identically. Its output is a packet synchronization start signal to the controller 145 for byte count capture and payload control of register 144. Operation of the start code detector 146 is preferably inhibited during receipt of the byte code field, the payload field and the CRC fields to avoid inadvertent detection of start code (SSC) in the rest of the received data of a data packet. The CRC check 147 receives the input serial data stream and outputs an error indication which the controller 145 outputs to user circuits 150 as "Error". The controller 145 initializes the CRC check 147 at the beginning of each packet and samples the two CRC bytes at the end of the data packet of FIG. 3. The serial to parallel converter 142 has a serial data stream input. The controller 145 synchronizes its operation to byte boundaries determined after the start code is detected. A valid output is a byte-wide data multiplex of both byte count and payload to register 144 and to byte count capture 143. Byte count capture 143 receives byte synched data. Its output to controller 145 is the value of the byte count field. The controller 145 synchs to the byte count field and so signals the interface register. Interface register 144 may receive a byte multiplex of byte count and payload and be controlled by controller 145 to output only payload P. The controller 145 synchronizes to the payload field P to control the CRC check 147.

The Link Rx controller 145 uses the start code to detect the beginning of the rest of the packet. Controller 145 controls the counting of bytes from then on, looking to reach the byte count value. The controller keeps all functional blocks synched to these byte boundaries of the data packet per FIG. 3. It also controls the idle signal versus start code decision, the idle signal being received over the LinkRxD line. Perhaps, more importantly, the controller 145 controls the user circuits 150 via ByteValid, FirstByte and Error signal generation. If the start code is programmable and variable, the start code is passed from configuration storage 141 to start code detector 146.

The data link of the present invention was designed for use in a benign communication channel, that is, one with a predictably low data error rate. Link Layer architectural design decisions were, in fact, made assuming that the Physical Layer would exhibit very low bit error rates. It was assumed that the Physical Layer would operate at high signal-to-noise (S/N) ratios, would have very little phase noise or jitter in the transmit-side time base, and that the receiver would employ high-Q clock recovery circuits. Correspondingly, receiver bit synchronization would be very good, with undesired bit insertions or deletions occurring only rarely. A final assumption was that the data link of the present invention would likely be a short haul connection, that is, one not involving distances on the order of thousands of miles. One typical data link application would be the connection of equipment sharing the same rack, or different racks within the same room or building. Short haul also contemplates typical distances of hundreds of miles of coaxial cable, glass fiber or, perhaps in the future, plastic fiber at low error rates. The about to-be-described Physical Layer specification was developed to satisfy the above requirements in as low cost a manner as possible.

Referring now to FIG. 5, the present Physical Layer functionality will now be described in some detail, by way of example, assuming a plastic fiber optic medium 540. In the originating equipment, a serial bitstream is clocked out of the Link Layer 110 at a fixed rate, this rate being determined by the time base 510 inherent to the Physical Layer. The serial bitstream is passed through an encoding process designed to match the spectral characteristics of the signal to the channel. This process is represented in the figure by the Channel Coding functional block 520. In the Transmitter functional block 530, the encoded symbols are analog waveform processed to equalize and extend the frequency response of the optical source. A typical transmitter suitable for the exemplary purposes of FIG. 3 is the Hewlett (R) Packard HFBR-15X7 transmitter or equivalent apparatus. The resulting waveform modulates the intensity of the optical output. The modulated optical signal is carried on a single plastic optical fiber to the receiving equipment 550 which may comprise, for example, a Hewlett Packard HFBR-25X6 receiver or equivalent apparatus.

In the receiving equipment, the baseband symbols are recovered from the optical signal by direct detection. These received symbols contain clock information from which the time base is recovered. The recovered clock is then used to sample and retime the received symbols. In FIG. 5, these functions (detection, clock recovery, and data retiming) are represented by the Receiver functional block 550. The Channel Decoding functional block 560, through which the retimed symbols are next passed, represents the processes that reverse the effect of the Channel Coding functional block 520. If there were no errors in transmission, the signal emerging from the decoding process will be merely a time delayed version of the serial bitstream from the Link Layer 110 in the originating equipment. That bitstream, along with the recovered time base, is then passed up to the Link Layer circuits 140 of the receiving equipment.

The Physical Layer Time Base specification sets the signalling rate for the overall link, and so determines the maximum allowable user data rate. The time base 510 is communicated to the Link Layer circuits 110 and 140 in both the originating and receiving equipment using the BaudClk and RecoveredClk signals as described above.

The nominal signalling rate for the exemplary physical layer of FIG. 5 is 54.000000 MBaud. This rate is fixed and is independent of user data rate. Higher clock rates on the order of 125 MegaBaud are anticipated and should be considered well within the contemplation of the present invention along with still higher clock rates.

By way of example, the 54.000000 MHz time base preferably should be accurate within 20 parts per million, plus or minus. This tolerance includes allowance for variation over temperature and first year aging.

The user data rate is a function of the fixed baud rate, the time base accuracy, the length of the data link Payload fields transmitted (FIG. 3), and the duration of the Idle Time between each data packet. The Physical Layer specification fixes the first two parameters, and the third is under user control. To determine a maximum user data rate one can assume zero Idle Time signal duration. Then, the maximum user data rate for any length Payload field, for any given clock, is calculated as follows:

$$\text{Max data rate} = \frac{B \times L \times (1 - E)}{48 + L},$$

where B is the baud rate, E is the worst case time base error as a ratio of the baud rate, L is the Payload field length in bits and 48 represents the overhead in bits (start code, byte count and CRC).

Assuming maximum length 256-byte Payload fields and a 54 MegaHertz clock, the maximum user data rate calculated using the above equation is:

52.762303 Mbps.

The maximum allowable user data rate when the data link Payload field carries 188-byte MPEG2 Transport Stream packets clocked at the same rate is:

52.328850 Mbps.

It must be noted that the average user data rate and the instantaneous user data rate may diverge significantly. On the other hand the data throughput efficiency is seen to be much greater than that achievable in prior art protocols such as TAXI. All user data rates less than the calculated maximum are supported by the present protocol (by simply increasing the duration of Idle Time signal).

The Link Layer 110 output signal is an NRZ coded serial bitstream including data and overhead or idle time signal. Consisting of multiplexed data packets and Idle Time bits, this bitstream could have a low transition density or excessive bias. These characteristics would make it difficult for the receiving equipment to recover the time base from incoming data. Therefore, the present exemplary Physical Layer suggests additional coding of the data to increase the transition density and decrease the probability of significant bias drift. One or more of the functions of the physical layer may be eliminated in other applications of the present invention.

As illustrated in FIG. 6, the channel coding process of channel coding block 520 consists of the concatenation of a scrambler 610 and a run-length activated inverter 620. Also shown in FIG. 6, the channel decoding process of channel decoding block 560 consists of the concatenation of a functionally identical run-length activated inverter 630 and a descrambler 640. Referring to FIG. 5, one may see where these processes appear in the physical layer signal chain.

This encode/decode process incurs no bandwidth penalty. No block code of the m-to-n type symbol mapping is required. This yields cost advantages in both the optical components and encode/decode circuit complexity.

The channel coding and decoding processes together provide a self-synchronizing scrambler/descrambler arrangement. The self-synchronizing feature of the arrangement allows the scrambler 610 and descrambler 630 to operate without "seeding" and without information regarding field or packet boundaries in the datastream. One of a family of maximal-length psuedo-random bit sequence generating polynomials is used to scramble the data. One exemplary generating polynomial for this sequence is:

$$G(X) = X^9 + X^4 + 1.$$

Both the scrambler 610 and descrambler 630 are preferably constructed as Linear Feedback Shift Registers (LFSR) with nine digital unit time delay elements (flip-flops). Each delay element is clocked synchronously by the signalling rate clock.

In the scrambler 610, the LFSR is connected as follows, where the label "In" represents the input signal to be scrambled and the label "Out" represents the resultant scrambled output signal:
D1=In XOR Q9=Out,
D2=Q1, D3=Q2,
D4=Q3,
D5=Q4 XOR In XOR Q9,
D6=Q5,
D7=Q6,
D8=Q7,
D9=Q8.

where XOR is the exclusive-or Boolean operator (modulo 2 addition), Di is the input to the ith delay element, Qi is the output of the ith delay element, and i is an element of {1,2,3,4,5,6,7,8,9}.

As mentioned above, the scrambler 610 output is preferably the result of the exclusive-or of the input signal and Q9, the output of the last delay element. This signal can be resampled and time delayed for clock synchronous operation.

In the descrambler 640, the LFSR is connected as follows, where the label "In" represents the previously scrambled signal being input to the descrambler and the label "Out" represents the resultant descrambled output signal:
D1=In
D2=Q1
D3=Q2
D4=Q3
D5=Q4 XOR In
D6=Q5
D7=Q6
D8=Q7
D9=Q8
Out=Q9 XOR In where XOR is the exclusive-or Boolean operator (modulo 2 addition), Di is the input to the ith delay element, Qi is the output of the ith delay element, and i is an element of {1,2,3,4,5,6,7,8,9}.

As described above, the descrambler output is the result of the exclusive-or of the input signal and Q9, the output of the last delay element. This signal can be resampled and time delayed for synchronous operation.

Operation of the Run-Length Activated Inverter of FIG. 6 is illustrated by the state diagram of FIG. 7. Referring now briefly to FIG. 7, there is shown a state diagram showing the eleven states S0 to S11 of a run length activated inverter 620 or 630. In the case of the inverter 620, input In represents the bit value of the output of scrambler 610 and the output Out represents TxD. In the case of inverter 630, the input In represents the bit value of RxD and the output Out is provided to descrambler 640. BaudClk clocks inverter 620 in originating equipment. RecoveredClk clocks the state machine inverter 630 to advance states in receiving equipment.

In essence, a run-length activated inverter circuit monitors its input bitstream for transitions, counting the run-length between the transitions (run-length being defined as the number of consecutive same-valued input bits). As long as the run-length is less than five, no inversion is performed and the value of the output bit will be the same as that of the input bit. If the run-length reaches five, the circuit will invert the bit following the fifth bit of the run, regardless of its input value. The inverted bit is not counted in either the original five bit run or the new sequence following the inversion. After the inverted bit is transmitted, a new run-length count is begun.

The Run-Length Activated Inversion process is self-reversing. The decoder 560 employs the same circuit to repair the inversions as the encoder 520 uses to create them.

The Transmitter functional block 530 of FIG. 5 consists of an LED optical source and the driver circuitry required to operate it. To ensure compatibility with other similar physical layer equipment, the optical source used in the Transmitter should preferably be the Hewlett Packard Components Group part HPBR-1527 (horizontal exit) or equivalent apparatus. This component is an LED with a visible output at a nominal wavelength of 650 nanometers. The LED is packaged in a grey plastic housing that acts as a receptacle for connectorized optical fiber, is board mountable, and is mechanically compatible with the Hewlett Packard Versatile Link, HFBR-0507 series. For vertical exit applications, the HFBR-1537 or equivalent apparatus may be used. The electrical, optical, and mechanical specifications of these parts are controlled by Hewlett Packard Publication 5962-9376E (April 1994) entitled "125 Megabaud Versatile Link, The Versatile Fiber Optic Connection, Technical Data".

One drive circuit that may be used with the recommended LED may be adapted from a circuit described in Hewlett Packard Publication 5963-0003E (July 1994), entitled "Fiber-Optic Solutions for 125 MBd Data Communication Applications at Copper Wire Prices, Application Note 1066". While it is possible to implement the transmitter with different drive circuitry than that described in these documents, extreme care should be taken in altering this design as it is very closely matched to the physical characteristics of the LED.

The Receiver functional block 550 of FIG. 5 consists of an optical detector, a quantizing circuit, and a phase-locked loop for clock recovery and data retiming. Transitions in the received data are compared to the phase of a VCXO of the phase-locked loop at the nominal baud rate. Once phase lock is achieved, the phase detector of the phase-locked loop itself inherently performs the data retiming function.

To ensure compatibility with other physical layer equipment specified above, the optical detector used in the Receiver should preferably be the Hewlett Packard Components Group part HFBR-2526 (horizontal exit) or equivalent apparatus. This component combines a PIN photodiode and a transimpedance preamplifier in one package. The electro-optical circuitry is contained within a blue plastic housing that acts as a receptacle for connectorized optical fiber, is board mountable, and is mechanically compatible with the Hewlett Packard Versatile Link, HFBR-0507 series. For vertical exit applications, the HFBR-2536 or equivalent apparatus may be used. The electrical, optical, and mechanical specifications of these parts are controlled by Hewlett Packard Publication 5962-9376E (April 1994) entitled "125 Megabaud Versatile Link, The Versatile Fiber Optic Connection, Technical Data".

The function of the quantizing circuit is to provide a logic level representation of the optical input signal. The quantizing circuit recommended for use with the specified detector is adapted from a circuit described in Hewlett Packard Publication 5963-0003E (July 1994), entitled "Fiber-Optic Solutions for 125 MBd Data Communication Applications at Copper Wire Prices, Application Note 1066".

While a data link according to the present invention requires that the receiving equipment Physical Layer circuitry recover the transmit time base, it does not specify the actual circuit elements for doing so. This circuit employs a Type II phase-locked loop to achieve bit synchronization. The circuit interfaces directly to the data output of the quantizer and outputs clock and data at 54 MBd with TTL levels.

For example, for implementations over short transmission distances of MPEG2 data, receiver 550 implementations preferably should perform at a bit error rate better than:

$2 \times 10^{-13}$

This number does not distinguish between Idle Time bits and data packet bits. The probability of receiving an errored packet in any specified time, given the error rate above, is directly proportional to the percentage of Physical Layer bandwidth devoted to data packets (versus Idle Time). Assuming no Idle Time (worst case), the probability of receiving an errored packet in any 24 hours may preferably meet the following relation:

P(error in 24 hrs)<0.4

Given the above, and using the CRC checking provided by the link, the probability of an errored packet going undetected becomes vanishingly small.

P(undetected error, 1 year)<<0.4

Plastic optical fiber compatible with the Hewlett Packard HFBR-R/EXXYYY series of cable should be used as medium 540 in an MPEG2 implementation. This fiber has a core diameter of 1 mm and an attenuation of less than 0.2 dB per meter. Fiber terminations should be compatible with the Hewlett Packard Versatile Link mechanical and optical specifications. Hewlett Packard specifies multiple connector options, including snap connectors, latching connectors, bulkhead adaptors, and unconnectorized cable for termination by the user.

To avoid overdriving the optical detector, the minimum acceptable fiber length is:

0.5 meters

To achieve the specified bit error rate performance, the maximum acceptable fiber length is:

20 meters.

On the other hand, hard clad silica (HCS) fiber may permit runs to increase to hundreds of meters. Other applications in other user circuits or with other physical media will come to mind from understanding the present exemplary plastic fiber example.

While the invention has been described in detail with reference to the appended drawings, the invention is limited in scope only by the claims. Moreover, any patent application or other reference cited herein should be construed to be incorporated by reference as to any subject matter deemed essential to the present disclosure.

I claim:

1. Physical layer data signal originating apparatus for application with a single optical fiber comprising a time base generator for generating a signal at a predetermined signaling rate, a channel coder comprising a data scrambler and a run-length activated inverter coupled to the time base and to an output of the scrambler, and a transmitter including an LED optical source and driver circuitry responsive to the output of the channel coder for outputting a signal to the optical fiber.

2. The physical layer data signal originating apparatus according to claim 1 wherein said data scrambler scrambles the digital data according to a pseudo-random bit sequence generated according to a polynomial.

3. Physical layer data signal receiving apparatus for application with a single optical fiber comprising a receiver including an optical detector and a clock recovery circuit responsive to the optical detector and a channel decoder comprising a run-length activated inverter and a descrambler, the channel decoder outputing clock and data to a link layer circuit.

4. Physical layer data signal receiving apparatus according to claim 3 wherein said data descrambler descrambles the digital data according to a pseudorandom bit sequence generated according to a polynomial.

* * * * *